United States Patent
Sarwar et al.

(10) Patent No.: US 10,469,459 B2
(45) Date of Patent: Nov. 5, 2019

(54) USE OF OPTICAL TRANSPORT NETWORK OVERHEAD DATA FOR ENCRYPTION

(71) Applicant: Fujitsu Limited, Kawasaki-Shi, Kanagawa (JP)

(72) Inventors: Muhammad Sakhi Sarwar, Brookfield, CT (US); Erik Charles Stewart, Coppell, TX (US); Junichi Sugiyama, Richardson, TX (US)

(73) Assignee: Fujitsu Limited, Kawasaki (JP)

( * ) Notice: Subject to any disclaimer, the term of this patent is extended or adjusted under 35 U.S.C. 154(b) by 246 days.

(21) Appl. No.: 15/482,440

(22) Filed: Apr. 7, 2017

(65) Prior Publication Data
US 2018/0295103 A1 Oct. 11, 2018

(51) Int. Cl.
| H04L 29/06 | (2006.01) |
| H04L 9/08 | (2006.01) |
| H04L 9/14 | (2006.01) |
| H04J 3/16 | (2006.01) |

(52) U.S. Cl.
CPC ........ *H04L 63/0428* (2013.01); *H04J 3/1652* (2013.01); *H04L 9/0894* (2013.01); *H04L 9/14* (2013.01); *H04L 69/22* (2013.01)

(58) Field of Classification Search
CPC ..... H04L 63/0428; H04L 9/0894; H04L 9/14; H04L 69/22; H04L 9/12; H04L 63/06; H04L 9/0816; H04L 2209/24; H04B 10/27; H04B 10/80; H04B 10/85; H04J 3/1652

See application file for complete search history.

(56) References Cited

U.S. PATENT DOCUMENTS

| 6,160,651 | A * | 12/2000 | Chang ................. | H04J 14/0227 370/352 |
| 6,985,488 | B2 * | 1/2006 | Pan ....................... | H04J 3/1617 370/395.3 |
| 7,100,020 | B1 * | 8/2006 | Brightman ............. | H04L 49/10 709/231 |
| 2008/0095150 | A1 * | 4/2008 | Lee ........................ | H04L 47/10 370/389 |
| 2009/0041469 | A1 * | 2/2009 | Hofmeister ............ | H04B 10/40 398/138 |
| 2010/0098252 | A1 * | 4/2010 | Kanter ................... | H04L 9/0852 380/256 |
| 2011/0135301 | A1 | 6/2011 | Myslinski et al. | |
| 2011/0219438 | A1 * | 9/2011 | Maino .................... | H04L 63/12 726/6 |
| 2011/0231653 | A1 | 9/2011 | Bollay et al. | |

(Continued)

OTHER PUBLICATIONS

International Telecommunication Union, "Interfaces for the Optical Transport Network" ITU-T G.709/Y.1331 (Jun. 2016); 244 pages.

(Continued)

*Primary Examiner* — Kambiz Zand
*Assistant Examiner* — Shu Chun Gao
(74) *Attorney, Agent, or Firm* — Baker Botts L.L.P.

(57) ABSTRACT

Methods and systems may use optical transport network overhead data for encryption. In particular, specific overhead encryption bits and other encryption data may be stored in an OTN header and used for signaling between a transmitter and a receiver for encrypted transmission without lost data frames.

20 Claims, 9 Drawing Sheets

(56) References Cited

U.S. PATENT DOCUMENTS

| | | | |
|---|---|---|---|
| 2012/0008778 A1* | 1/2012 | Mayer | H04L 9/12 380/255 |
| 2012/0201535 A1 | 8/2012 | Loprieno et al. | |
| 2012/0263475 A1* | 10/2012 | Su | H04J 3/1652 398/100 |
| 2012/0266209 A1 | 10/2012 | Gooding et al. | |
| 2014/0348140 A1* | 11/2014 | Atkinson | H04L 12/417 370/336 |
| 2015/0215116 A1* | 7/2015 | Gong | H04B 10/85 380/256 |
| 2016/0149867 A1* | 5/2016 | Lohr | H04B 10/85 380/256 |
| 2016/0301669 A1* | 10/2016 | Muma | H04L 63/0428 |
| 2016/0344507 A1* | 11/2016 | Marquardt | H04J 14/0227 |
| 2017/0099354 A1 | 4/2017 | Moynihan et al. | |
| 2017/0126458 A1* | 5/2017 | Shattil | H04W 52/241 |
| 2017/0171163 A1* | 6/2017 | Gareau | H04L 63/061 |
| 2017/0262567 A1* | 9/2017 | Vassiliev | H03K 19/17704 |
| 2018/0294958 A1* | 10/2018 | Sarwar | H04L 63/0478 |
| 2018/0295103 A1* | 10/2018 | Sarwar | H04L 63/0428 |
| 2018/0295116 A1* | 10/2018 | Sarwar | H04Q 11/0066 |
| 2018/0310078 A1* | 10/2018 | Szymanski | H04L 47/56 |

OTHER PUBLICATIONS

International Telecommunication Union, "Architecture of Optical Transport Networks" ITU-T G.872 (Jan. 2017); 68 pages.

* cited by examiner

USE OF OPTICAL TRANSPORT NETWORK OVERHEAD DATA FOR ENCRYPTION

BACKGROUND

Field of the Disclosure

The present disclosure relates generally to optical communication networks and, more particularly, to use of optical transport network overhead data for encryption.

Description of the Related Art

Telecommunication, cable television and data communication systems use optical networks to rapidly convey large amounts of information between remote points. In an optical network, information is conveyed in the form of optical signals through optical fibers. Optical fibers may comprise thin strands of glass capable of communicating the signals over long distances. Optical networks often employ modulation schemes to convey information in the optical signals over the optical fibers. Such modulation schemes may include phase-shift keying (PSK), frequency-shift keying (FSK), amplitude-shift keying (ASK), and quadrature amplitude modulation (QAM).

In addition to modulation of data, optical networks may provide encryption of a data payload that is transmitted over an optical path. The encryption of the data payload involves using an encryption key to encrypt and decrypt the data and may be performed using symmetric or asymmetric encryption between nodes in the optical network, such as between a transmitting transponder and a receiving transponder. The generation and secure exchange of encryption keys may be a computationally intensive and slow operation that may constrain the use of encryption, particularly as communication systems become more dense and the number of nodes between which encryption is desired increases. Also, when activating and deactivating encryption over the optical path or during rotation of encryption keys, conventional methods may drop data frames, which is undesirable.

SUMMARY

In one aspect, a disclosed method is for encryption in optical transport networks. The method may include receiving, at a transmitter and a receiver, provisioning instructions for provisioning an optical path between a first port at the transmitter and a second port at the receiver in an optical transport network (OTN), and receiving, at the transmitter and at the receiver, encryption instructions to encrypt a data payload in OTN frames transmitted from the first port to the second port. The method may further include using overhead encryption bits in an overhead portion of the OTN frames for encryption signaling. In the method, the overhead encryption bits may further include a set_encryption bit indicative of whether the data payload is encrypted or unencrypted, a deprovision_encryption bit indicative of deprovisioning of encrypting the data payload, and at least one encryption key bit identifying an encryption key selected from a plurality of encryption keys.

In any of the disclosed embodiments, the method may further include using the overhead encryption bits to perform a first transition from an unencrypted data payload to an encrypted data payload without loss of an OTN frame during the first transition.

In any of the disclosed embodiments, the method may further include using the overhead encryption bits to perform a second transition from an encrypted data payload to an unencrypted data payload without loss of an OTN frame during the second transition.

In any of the disclosed embodiments, the method may further include using the overhead encryption bits to perform a third transition from the transmitter and the receiver using a first encryption key to using a second encryption key without loss of an OTN frame during the third transition.

In any of the disclosed embodiments of the method, the overhead encryption bits may be stored as additional authenticated data (AAD) in the overhead portion of the OTN frames using a 32-bit vector at bytes 11 through 14 in a 64-byte OTN header.

In any of the disclosed embodiments, the method may further include using a 128-bit tag in an overhead portion of the OTN frames for data integrity of the AAD. In the method, the AAD and the encryption key may be used to authenticate the 128-bit tag, while the 128-bit tag may be stored in the OTN frames at bytes 21 through 29 and bytes 33 through 39 in a 64-byte OTN header.

In any of the disclosed embodiments, the method may further include using an initialization vector (IV) in an overhead portion of the OTN frames to store a 48-bit counter value that counts OTN frames and is reset each time the at least one encryption key is changed.

In any of the disclosed embodiments of the method, the 48-bit counter value may be stored in the OTN frames at byte 7 and bytes 57 through 61 in a 64-byte OTN header.

In any of the disclosed embodiments of the method, the at least one encryption key may be locally stored at both the transmitter and at the receiver.

In any of the disclosed embodiments of the method, the transmitter and the receiver may be OTN transponders.

In a further aspect, an optical transport network (OTN) for encryption without lost data frames is disclosed. The OTN may include an optical path provisioned between a first port at a transmitter and a second port at a receiver included in the OTN. In the OTN, the transmitter and the receiver may be enabled for receiving provisioning instructions for provisioning the optical path, receiving encryption instructions to encrypt a data payload in OTN frames transmitted from the first port to the second port. In the OTN, the transmitter and the receiver may be further enabled for using overhead encryption bits in an overhead portion of the OTN frames for encryption signaling. In the OTN, the overhead encryption bits may further include a set_encryption bit indicative of whether the data payload is encrypted or unencrypted, a deprovision_encryption bit indicative of deprovisioning of encrypting the data payload, and at least one encryption key bit identifying an encryption key selected from a plurality of encryption keys.

In any of the disclosed embodiments of the OTN, the transmitter and the receiver may further be enabled for using the overhead encryption bits to perform a first transition from an unencrypted data payload to an encrypted data payload without loss of an OTN frame during the first transition.

In any of the disclosed embodiments of the OTN, the transmitter and the receiver may further be enabled for using the overhead encryption bits to perform a second transition from an encrypted data payload to an unencrypted data payload without loss of an OTN frame during the second transition.

In any of the disclosed embodiments of the OTN, the transmitter and the receiver may further be enabled for using the overhead encryption bits to perform a third transition from the transmitter and the receiver using a first encryption key to using a second encryption key without loss of an OTN frame during the third transition.

In any of the disclosed embodiments of the OTN, the overhead encryption bits may be stored as additional authenticated data (AAD) in the overhead portion of the OTN frames using a 32-bit vector at bytes 11 through 14 in a 64-byte OTN header.

In any of the disclosed embodiments of the OTN, the transmitter and the receiver may further be enabled for using a 128-bit tag in an overhead portion of the OTN frames for data integrity of the AAD, wherein the AAD and the encryption key are used to authenticate the 128-bit tag, and wherein the 128-bit tag is stored in the OTN frames at bytes 21 through 29 and bytes 33 through 39 in a 64-byte OTN header.

In any of the disclosed embodiments of the OTN, the transmitter and the receiver may further be enabled for using an initialization vector (IV) in an overhead portion of the OTN frames to store a 48-bit counter value that counts OTN frames and is reset each time the at least one encryption key is changed.

In any of the disclosed embodiments of the OTN, the 48-bit counter value may be stored in the OTN frames at byte 7 and bytes 57 through 61 in a 64-byte OTN header.

In any of the disclosed embodiments of the OTN, the at least one encryption key may be locally stored at both the transmitter and at the receiver.

In any of the disclosed embodiments of the OTN, the transmitter and the receiver may be OTN transponders.

BRIEF DESCRIPTION OF THE DRAWINGS

For a more complete understanding of the present disclosure and its features and advantages, reference is now made to the following description, taken in conjunction with the accompanying drawings, in which.

DESCRIPTION OF THE EMBODIMENT(S)

Figure 1:
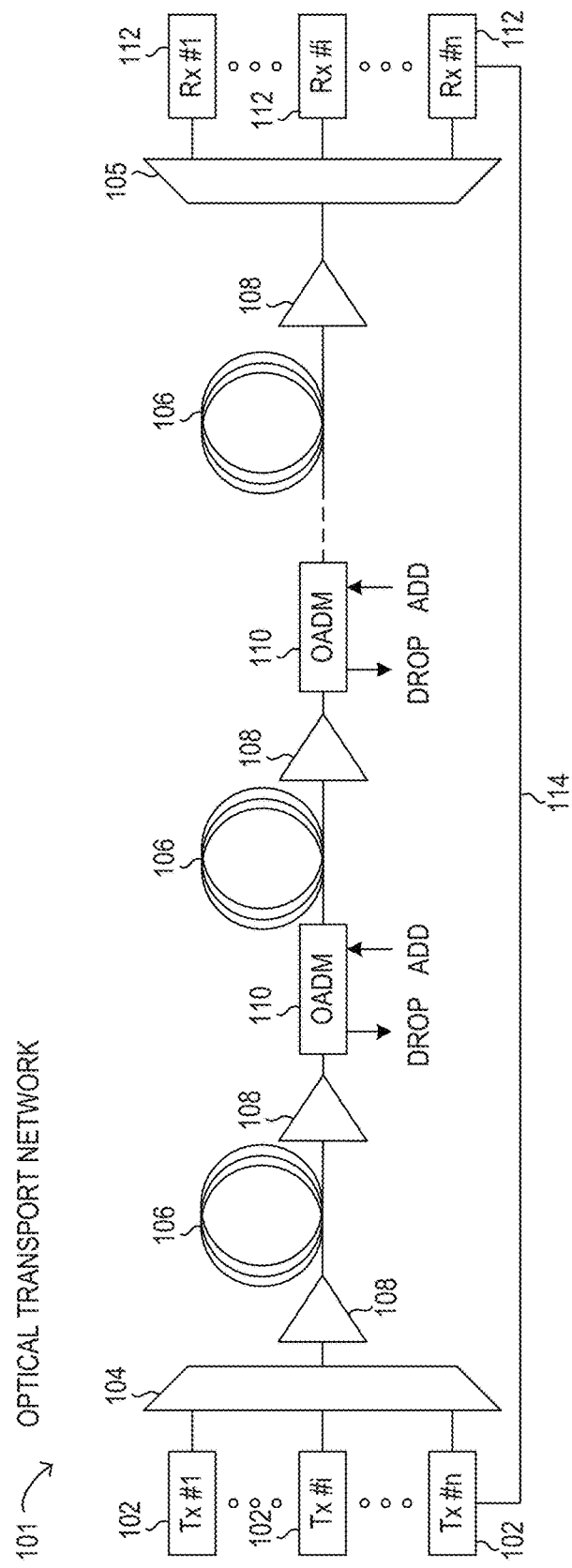
FIG. 1 is a block diagram of selected elements of an embodiment of an optical transport network.

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72".

Referring now to the drawings, FIG. 1 illustrates an example embodiment of optical transport network (OTN) 101, which may represent an optical communication system. Optical transport network 101 includes one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. Thus, in a superchannel, subcarriers are tightly packed and consume less optical spectrum than in conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the baud rate (see also FIG. 2).

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification". Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

In various embodiments, transmitters 102 and receivers 112 may be implemented using a so-called "transponder" that can convert between electrical and optical signals (as a transmitter) or between optical and electrical signals (as a receiver). One example of a transponder is a 1FINITY™ T100 Transport (Fujitsu Network Communications, Inc.). Also, in particular embodiments, multiplexer 104 and demultiplexer 105 may be implemented as a ROADM, such as a 1FINITY™ L100 Lambda (Fujitsu Network Communications, Inc.).

Also shown with optical transport network 101 in FIG. 1 is an out-of-band auxiliary network connection 114, which may connect any of transmitters 102 with any of receivers 112. Auxiliary network connection 114 may be implemented using any of a variety of network connections. In some embodiments, auxiliary network connection 114 may be an Ethernet network connection over a private network or a public network, such as the Internet. In other embodiments, auxiliary network connection 114 may be a wireless network connection. In selected embodiments, auxiliary network connection 114 may be another optical or galvanic connection, such as for maintenance or network control purposes (see also network 232 in FIG. 2). In various embodiments, auxiliary network connection 114 may be used for certain communications associated with use of optical transport network overhead data for encryption, as disclosed herein.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "m-QAM."

Examples of PSK and QAM with a different number of symbols can include binary PSK (BPSK or 2-PSK) using two phases at 0° and 180° (or in radians, 0 and π) on the constellation diagram; or quadrature PSK (QPSK, 4-PSK, or 4-QAM) using four phases at 0°, 90°, 180°, and 270° (or in radians, 0, π/2, π, and 3π/2). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, m-QAM signals may be polarized using techniques such as dual-polarization 16-QAM (DP-16-QAM), wherein separate m-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (see also FIG. 2) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 may employ a digital wrapper technology to encapsulate existing frames of data, which may originate in a variety of native protocols, and may add packetized overhead for addressing, management, and quality assurance purposes. The resulting optical signal, in the form of optical data units (ODUs) may then be transported using individual optical wavelengths by optical transport network 101. The packetized overhead may be used to monitor and control the optical signals being transported using any of a variety of different protocols. In particular embodiments, operation of optical transport network 101 is performed according to optical transport networking (OTN) standards or recommendations promulgated by the International Telecommunications Union (ITU), such as ITU-T G.709—"Interfaces for the Optical Transport Network" and ITU-T G.872—"Architecture of the Optical Transport Network", among others.

In FIG. 1, optical transport network 101 may implement encryption of a data payload transmitted between transmitters 102 and receivers 112. As noted, for example, transmitter 102 and receiver 112 may be implemented using an OTN transponder having similar capabilities that supports bidirectional conversion between optical and electrical signals (see also FIG. 3). The OTN transponder may include some data processing capability, such as a processor having access to memory media storing instructions executable by the processor. In some embodiments, the data processing capability in the OTN transponder may include a digital signal processor (DSP). In various embodiments, the data processing capability in the OTN transponder may be implemented using a field-programmable gate array (FPGA). The data processing capability in the OTN transponder may be used for various operations, such as implementing side-band communication channels, authentication, encryption key generation, encryption key exchange, encryption, de-encryption, and data integrity, among others.

Typically, when encryption is used, a data payload at transmitter 102 is received and may be encrypted before the data payload is packaged into an optical payload unit (OPU), and an optical data unit (ODU). When the ODU arrives at receiver 112, the encrypted data payload is unpacked from the transmission packet structure and may be decrypted to yield the original data payload. As noted, transmitter 102 and receiver 112 may comprise the same OTN transponder (see also OTN transponder 300 in FIG. 3) for performing encryption and decryption, among other operations. Although various encryption methods may be used, symmetric encryption is often used with a common encryption key that is shared for both encryption and decryption. Because the common encryption key is fundamental for security using symmetric encryption, secure procedures are used to generate and share the encryption key prior to encrypting the data payload.

The generation and sharing of the encryption key may begin when a user, such as a network administrator, configures an OTN path at optical transport network 101. For example, the user may use any of a variety of secure network connections to connect to both transmitter 102 and receiver 112 to configure the OTN path. Some examples of network protocols and network connections used to configure the OTN path and authenticate the endpoints of the OTN path may include a command line interface (CLI), a simple network management protocol (SNMP), a hypertext transfer protocol with an encrypted connection, such as Secure Socket Layer (SSL) or Transport Layer Security (TLS), and an RSA based protocol (RSA Security LLC, Bedford, Mass., USA). TLS is published by the Internet Engineering Task Force (IETF) and is a secure cryptographic network protocol that is a replacement for Secure Socket Layer (SSL). Configuring the OTN path may include authentication of both receiver 102 and transmitter 112 to the user. Once the OTN path is configured to transmit traffic, the user may then activate encryption for the traffic over optical transport network 101. To implement encryption, a communication channel is established between transmitter 102 and receiver 112. The communication channel may be an in-band channel over optical transport network 101, such as a general communication channel (GCC0). In some embodiments, the communication channel may be an out-of-band channel using auxiliary network connection 114, such as an Ethernet network connection between transmitter 102 and receiver 112. For example, transmitter 102 may attempt to establish the communication channel with receiver 112 using TLS.

To establish the communication channel and set up the TLS connection, various methods or algorithms may be used for key generation and sharing. In an initial step, a pre-shared key (PSK) protocol may be used to establish the communication channel, using a PSK that is shared in advance between transmitter 102 and receiver 112. For example, the PSK may be an authentication key comprising a password that is provided to transmitter 102 and receiver 112. Then, an encryption key may be generated and shared using the communication channel and a key exchange protocol, such as a Diffie-Hellman algorithm for symmetric encryption, for example. Other key exchange protocols for symmetric encryption may be used in various embodiments. Specific variations of the Diffie-Hellman algorithm may also include elliptic curve Diffie-Hellman (ECDH) and ECDH ephemeral (ECDHE). In given embodiments, the encryption key generated by the TLS connection may conform to an Advanced Encryption Standard (AES)-256 for 256-bit encryption keys. Additionally, the TLS connection over the communication channel may employ a data integrity protocol, such as a secure hash algorithm (SHA) designed by the U.S. National Security Agency (NSA) to ensure that no data errors occur over the TLS connection. In various embodiments, the secure hash algorithm may be a SHA-1 or a SHA-2 algorithm designed by NSA.

Once the TLS connection is established, it would be possible to use the TLS connection for encryption of the data payload using the encryption key. However, the performance of TLS may be inadequate for the line rates used in OTN and TLS may be undesirable for this reason. In typical implementations, the TLS connection uses the encryption key generation and sharing scheme between transmitter 102 and receiver 112 to generate a second encryption key, and then uses the second encryption key for encryption of the data payload. However, generating the second encryption key, for example using transmitter 112, may not be desirable because of the computational overhead involved with generating each encryption key. Additionally, when transmitter 112 is implemented as a modular component with a plurality of network ports, such as a 1FINITY™ T100, the processor available to service the OTN path may be used to service other OTN paths that may be physically routed through other ports on the same modular component. As a result, the processor capacity available to transmitter 112 may be subject to large computational demands when encryption is used, which may slow or impede operation of transmitter 112. Also, in bandwidth constrained networks, the overhead associated with generation and sharing of the encryption key may limit the effective use of encryption, particularly where an out-of-band channel over an auxiliary connection is not available.

As described herein, methods and systems are disclosed for use of optical transport network overhead data for encryption and may include a simplified encryption key generation. A simplified encryption key generation may use the encryption key from the TLS connection to encrypt the data payload at line rates over the OTN path. For example, transmitter 102 may be a party to the TLS connection and may already store the encryption key used for TLS, which is accessible to the processor in transmitter 102. Then, transmitter 102 may continue to use the encryption key to encrypt the data payload, without using the TLS connection. In this manner, a secure key generation and sharing protocol is used, while the actual encryption of the data payload may be performed using a more efficient method, such as a Galois/counter mode (GCM) encryption algorithm, which is particularly desirable at the high line rates used in optical transport network 101. In this manner, the methods and systems for simplified encryption key generation in optical networks disclosed herein may provide an improvement over conventional methods, in which a second encryption key is generated and shared. The methods and systems for simplified encryption key generation in optical networks disclosed herein may accordingly avoid the computational overhead of generating the second encryption key, which may be substantial in an OTN environment with multiple ports and multiple optical paths at a given node that may manage multiple encrypted connections at the same time. The methods and systems for simplified encryption key generation in optical networks disclosed herein may be useful for generating and sharing an encryption key in resource constrained networks, where computational capacity and network bandwidth are limited.

Additionally, as described in further detail herein, encryption control in optical networks without data loss may involve the use of optical transport network overhead data for encryption, and may further comprise a communication protocol to activate or deactivate encryption of the data payload in OTN frames transmitted from transmitter 102 to receiver 112. The methods and systems for use of optical transport network overhead data for encryption may enable activation or deactivation of encryption with a seamless transition between a last unencrypted OTN frame to a first encrypted OTN frame, without dropping or loss of any OTN frames. The methods and systems for use of optical transport network overhead data for encryption may further enable the seamless transition for key rotation, in which a first encryption key is replaced with a second encryption key without dropping or loss of any OTN frames. The methods and systems for use of optical transport network overhead data for encryption may use OTN overhead data to store signal bits used in the communication protocol to control encryption.

Specifically, overhead encryption bits in an overhead portion of the OTN frames may be used for encryption signaling to ensure that no OTN frames are dropped or lost during certain transitions, such as between activating and deactivating encryption of the data payload, or transitioning from using a first encryption key to using a second encryption key. The overhead encryption bits may include:
  a set_encryption bit indicative of whether the data payload is encrypted or unencrypted;
  a deprovision_encryption bit indicative of deprovisioning of encrypting the data payload; and
  at least one encryption key bit identifying an encryption key selected from a plurality of encryption keys.

For example, the overhead encryption bits may be sent in an overhead portion of each OTN frame. In some embodiments, a bidirectional optical path may be established between transmitter 102 and receiver 112 (e.g. when OTN transponders are used), such that OTN frames are continuously sent and received in each direction once the OTN optical path is provisioned, regardless of whether actual data traffic in the form of a data payload in each OTN frame is transmitted. Thus, the overhead encryption bits may be used for bidirectional signaling between transmitter 102 and receiver 112 to prevent dropped or lost OTN frames, as described herein. It is noted that in some embodiments, auxiliary network connection 114 may be used for communication, such as from receiver 112 to transmitter 102, for example, when the OTN optical path is unidirectional from transmitter 102 to receiver 112. The use of the overhead encryption bits for signaling between transmitter 102 and receiver 112 is described in further detail with respect to FIGS. 4 through 10.

Figure 2:
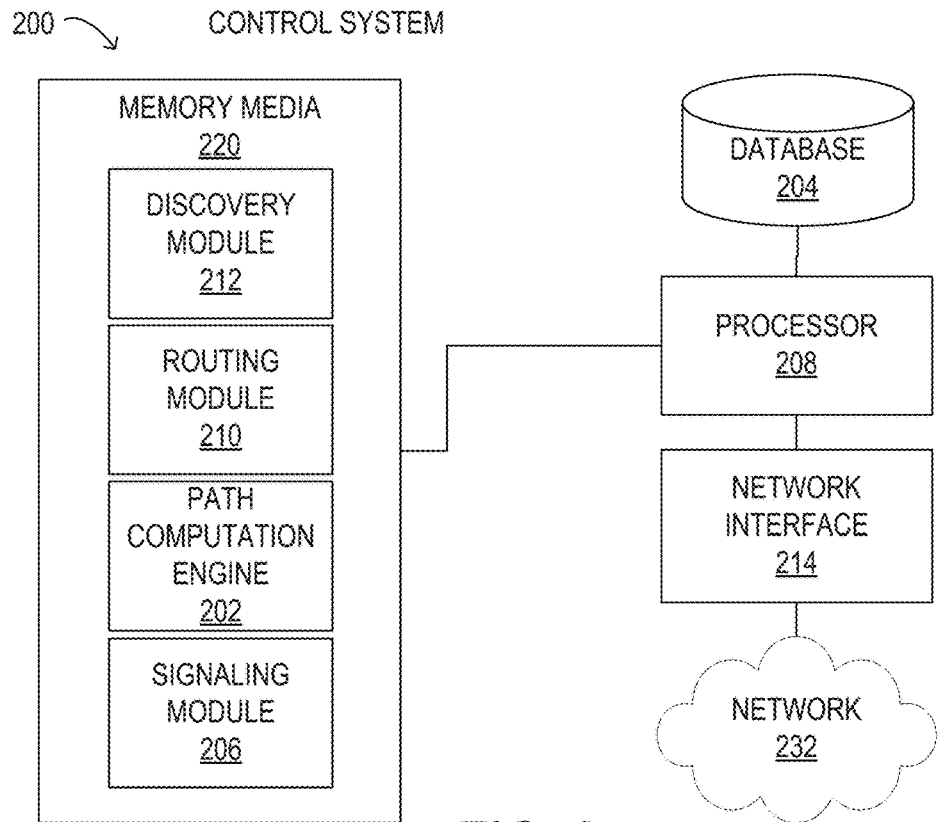
FIG. 2 is a block diagram of selected elements of an embodiment of an optical control plane system.

Referring to FIG. 2, a block diagram of selected elements of an embodiment of control system 200 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. In particular, control system 200 may represent at least certain portions of a network management system used to facilitate use of optical transport network overhead data for encryption, as described herein.

In FIG. 2, the control plane applications executed by control system 200 may work together to automatically establish services within the optical network. Discovery module 212 may discover local links connecting to neighbors. Routing module 210 may broadcast local link information to optical network nodes while populating database 204. When a request for service from the optical network is received, path computation engine 202 may be called to compute a network path using database 204. This network path may then be provided to signaling module 206 to establish the requested service.

As shown in FIG. 2, control system 200 includes processor 208 and memory media 220, which may store executable instructions (i.e., executable code) that may be executable by processor 208, which has access to memory media 220.

Processor 208 may execute instructions that cause control system 200 to perform the functions and operations described herein. For the purposes of this disclosure, memory media 220 may include non-transitory computer-readable media that stores data and instructions for at least a period of time. Memory media 220 may comprise persistent and volatile media, fixed and removable media, and magnetic and semiconductor media. Memory media 220 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory, non-transitory media, or various combinations of the foregoing. Memory media 220 is operable to store instructions, data, or both. Memory media 220 as shown includes sets or sequences of instructions that may represent executable computer programs, namely, path computation engine 202, signaling module 206, discovery module 212, and routing module 210.

Also shown included with control system 200 in FIG. 2 is network interface 214, which may be a suitable system, apparatus, or device operable to serve as an interface between processor 208 and network 232. Network interface 214 may enable control system 200 to communicate over network 232 using a suitable transmission protocol or standard. In some embodiments, network interface 214 may be communicatively coupled via network 232 to a network storage resource. In some embodiments, network 232 represents at least certain portions of optical transport network 101. Network 232 may also include certain portions of a network using galvanic or electronic media. In certain embodiments, network 232 may include at least certain portions of a public network, such as the Internet. Network 232 may be implemented using hardware, software, or various combinations thereof.

In certain embodiments, control system 200 may be configured to interface with a person (a user) and receive data about the optical signal transmission path. For example, control system 200 may also include or may be coupled to one or more input devices and output devices to facilitate receiving data about the optical signal transmission path from the user and to output results to the user. The one or more input or output devices (not shown) may include, but are not limited to, a keyboard, a mouse, a touchpad, a microphone, a display, a touchscreen display, an audio speaker, or the like. Alternately or additionally, control system 200 may be configured to receive data about the optical signal transmission path from a device such as another computing device or a network node, for example via network 232.

As shown in FIG. 2, in some embodiments, discovery module 212 may be configured to receive data concerning an optical signal transmission path in an optical network and may be responsible for discovery of neighbors and links between neighbors. In other words, discovery module 212 may send discovery messages according to a discovery protocol, and may receive data about the optical signal transmission path. In some embodiments, discovery module 212 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 2, routing module 210 may be responsible for propagating link connectivity information to various nodes within an optical network, such as optical transport network 101. In particular embodiments, routing module 210 may populate database 204 with resource information to support traffic engineering, which may include link bandwidth availability. Accordingly, database 204 may be populated by routing module 210 with information usable to determine a network topology of an optical network.

Path computation engine 202 may be configured to use the information provided by routing module 210 to database 204 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 202 may consider the interplay between the transmission degradation factors. In various embodiments, path computation engine 202 may generate values for specific transmission degradation factors. Path computation engine 202 may further store data describing the optical signal transmission path in database 204.

In FIG. 2, signaling module 206 may provide functionality associated with setting up, modifying, and tearing down end-to-end networks services in an optical network, such as optical transport network 101. For example, when an ingress node in the optical network receives a service request, control system 200 may employ signaling module 206 to request a network path from path computation engine 202 that may be optimized according to different criteria, such as bandwidth, cost, etc. When the desired network path is identified, signaling module 206 may then communicate with respective nodes along the network path to establish the requested network services. In different embodiments, signaling module 206 may employ a signaling protocol to propagate subsequent communication to and from nodes along the network path.

In operation, at least one the modules of control system 200 may be used to implement use of optical transport network overhead data for encryption, as described herein. For example, signaling module 206 may be used to enable the user to establish network services, including encryption of the data payload over the desired network path. For example, signaling module 206 may enable the user to communicate with transmitter 102 and receiver 112 for the desired network path. Additionally, signaling module 206 may transmit data indicative of operation of transmitter 102 and receiver 112, such as information indicative of encryption performance or data integrity. In some embodiments, signaling module 206 is used to send instructions to transmitter 102 and receiver 112, such as provisioning instructions or encryption instructions.

Figure 3:
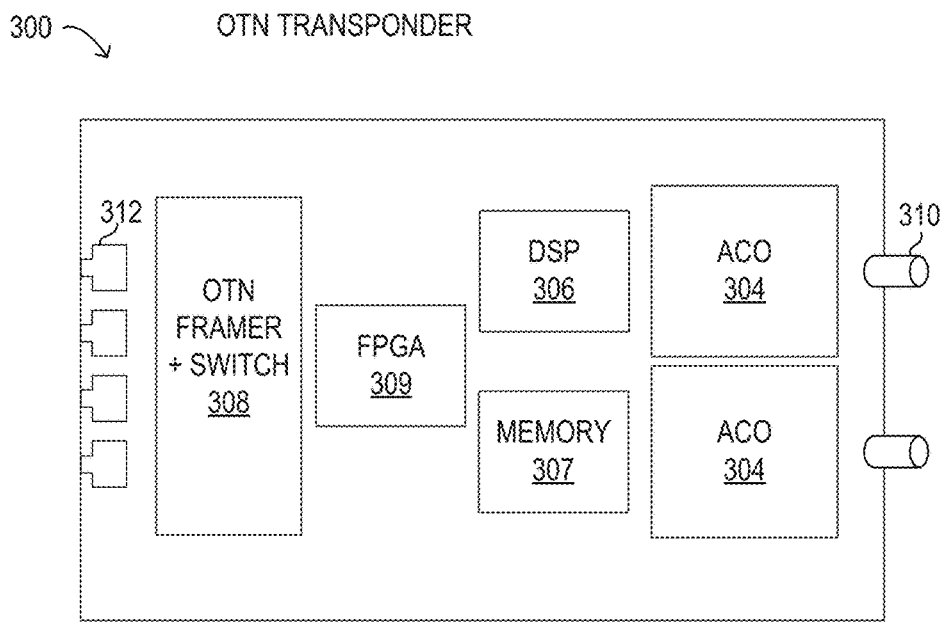
FIG. 3 is a block diagram of selected elements of an embodiment of an OTN transponder.

Referring now to FIG. 3, a block diagram of selected elements of an embodiment of an OTN transponder 300 is illustrated. FIG. 3 is a schematic illustration. OTN transponder 300 may represent various types of optical transceivers, such as transmitter 102 and receiver 112, in various embodiments. OTN transponder 300 may function as a transceiver, with OTN ports 310 (shown as cylindrical ports) being respectively converted between ODUs and Ethernet packets transmitted by Ethernet ports 312. In the exemplary embodiment shown in FIG. 3, OTN transponder 300 is implemented with two analog coherent optical (ACO) transceivers 304, for example, that may support 100G or 200G OTN lines, while Ethernet ports 312 may support 100G Ethernet. It is noted that OTN transponder 300 may be dimensioned for various data throughput rates and may be compatible with different types of optical and copper wire based connectors and receptacles. Although not depicted in FIG. 3, OTN transponder 300 may accordingly include various connector ports for optical or copper wire based connections.

As shown in FIG. 3, OTN transponder includes an FPGA 309 that may be configured to provide processing functionality associated with operation of transmitter 102 and receiver 112. For example, FPGA 309 may be enabled for at least certain processing and logical aspects of use of optical transport network overhead data for encryption disclosed herein. OTN transponder 300 may further include a digital signal processor (DSP) 306 having access to a memory 307, which may store executable instructions (i.e., executable code) that may be executable by DSP 306. In various embodiments, DSP 306 may operate to support or augment the processing, computational, and logic capability of FPGA 309. DSP 306 may execute instructions that cause OTN transponder 300 to perform various signal processing operations, general processing operations, computations, and logic operations. For example, DSP 306 may implement a pseudo random number generator (PRNG) in some embodiments. In selected embodiments, FPGA 309 may be used without DSP 306 or memory 307. In selected embodiments, DSP 306 and memory 307 may be used without FPGA 309. It is further noted that FPGA 309 may internally include an FPGA memory (not shown) that may be used to store data, such as an encryption key, among other information, such as information associated with encrypting payload data transmitted through OTN transponder 300. For the purposes of this disclosure, memory 307 may include non-transitory computer-readable media that stores data and instructions for at least a period of time. Memory 307 may comprise persistent and volatile media, fixed and removable media, and magnetic and semiconductor media. Memory 307 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory, non-transitory media, or various combinations of the foregoing. Memory 307 is operable to store instructions, data, or both. Also shown included in OTN transponder 300 is an OTN framer+switch 308, which may perform OTN frame processing, such as converting between ODUs and Ethernet frames or vice versa, for example. In addition, OTN framer+switch 308 may perform Ethernet switching among Ethernet ports 312.

In operation, OTN transponder 300 may implement at least certain portions of the use of optical transport network overhead data for encryption as described herein. For example, OTN transponder 300 may implement the TLS connection described above for an OTN path. Then, memory 307 may be used to store the encryption key from the TLS connection, and to use the encryption key for encryption of the data payload transmitted by OTN transponder 300. Also, memory 307 may be used to store OTN overhead data, such as overhead encryption bits (see also FIG. 10), that is used to activate or deactivate encryption of the data payload in OTN frames transmitted from transmitter 102 to receiver 112, or for encryption key rotation during encrypted transmission.

Figure 4:
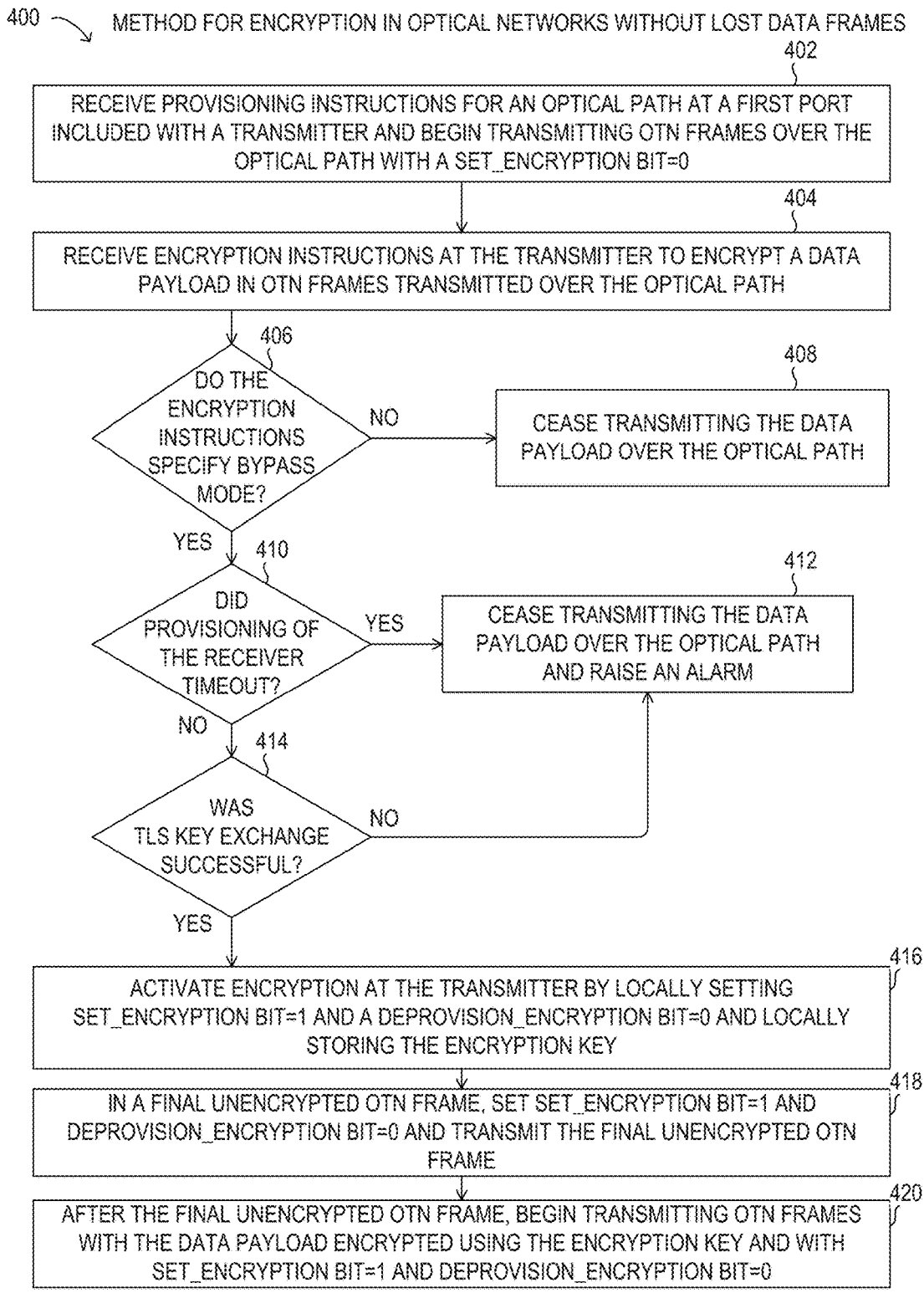
FIG. 4 is a flow chart of selected elements of a method for encryption control in optical networks without data loss.

Referring now to FIG. 4, a flow chart of selected elements of an embodiment of a method 400 for encryption control in optical networks without data loss, including the use of optical transport network overhead data for encryption, as described herein, is depicted in flowchart form. In particular, method 600 describes provisioning of encryption without lost data frames. Method 400 may be performed using optical transport network 101. In particular embodiments, method 400 may be executed by OTN transponder 300 functioning as transmitter 102, as described above, for an OTN optical path between a first port at transmitter 102 and a second port at receiver 112. It is noted that certain operations described in method 400 may be optional or may be rearranged in different embodiments.

Method 400 may begin at step 402 by receiving provisioning instructions for an optical path at a first port included with a transmitter and begin transmitting OTN frames over the optical path with a set_encryption bit=0. The value set_encryption bit=0 may be indicative of deactivated encryption. It is noted that the logic of bits disclosed herein may be implemented with any desired polarity, in different embodiments. At step 404, encryption instructions are received at the transmitter to encrypt a data payload in OTN frames transmitted over the optical path.

In method 400, at step 406, a decision is made whether the encryption instructions specify bypass mode. Bypass mode may provide the ability to override the encryption control in optical networks without data loss disclosed herein, and to select a conventional transition for activating encryption that involves dropping of certain OTN frames, such as the first encrypted OTN frame. When the result of step 406 is NO and bypass mode is not specified by the encryption instructions, at step 408, method 400 ceases transmitting the data payload over the optical path, and may then resume transmitting the data payload only after encryption of the data payload. Thus, when the result of step 406 is NO and bypass mode is not specified by the encryption instructions, an initial OTN frame transmitted with encrypted data payload and with set_encryption bit=1 may be dropped (not shown) by receiver 112, because receiver 112 may be enabled to activate decryption of the data payload only after a second OTN frame with set_encryption bit=1 is received, for example. When the result of step 406 is YES and bypass mode is specified by the encryption instructions, at step 410, a decision is made whether provisioning of the receiver has timed out. A timeout of receiver 112 may occur, for example, when step 505 (see FIG. 5) is not completed within a certain time limit, which may be a predetermined time limit. When the result of step 410 is YES and provisioning of the receiver has timed out, at step 412, method 400 ceases transmitting the data payload over the optical path and raises an alarm. It will be understood that the alarm may be handled in optical transport network 101 by appropriate entities, such as by a network administrator (not shown) or by control system 200, in given embodiments.

In method 400, when the result of step 410 is NO and provisioning of the receiver has not timed out, at step 414, a decision may be made whether the TLS key exchange was successful. When the result of step 414 is NO and the TLS key exchange was not successful, method 400 may proceed to step 412. When the result of step 414 is YES and the TLS key exchange was successful, at step 416, encryption at the transmitter is activated by locally setting set_encryption bit=1 and deprovision_encryption bit=0 and locally storing the encryption key. For example, transmitter 102 may locally store the overhead encryption bits and the encryption key using FPGA 309 or memory 307, when transmitter 102 is implemented as OTN transponder 300 (see FIG. 3). At step 418, in a final unencrypted OTN frame, set_encryption bit=1 and deprovision_encryption bit=0 are set and the final unencrypted OTN frame is transmitted. In step 418, transmitter 102 may select the final unencrypted OTN frame when transmitter 102 is ready to immediately transition to encryption of the data payload. The final unencrypted OTN frame is used to signal receiver 112 that the next frame will have an encrypted data payload with advance notice in order for receiver 112 to become ready to decrypt the next OTN frame received without frame loss. At step 420, after the final unencrypted OTN frame, OTN frames will begin transmitting with the data payload encrypted using the encryption key and with set_encryption bit=1 and deprovision_encryption bit=0.

Figure 5:
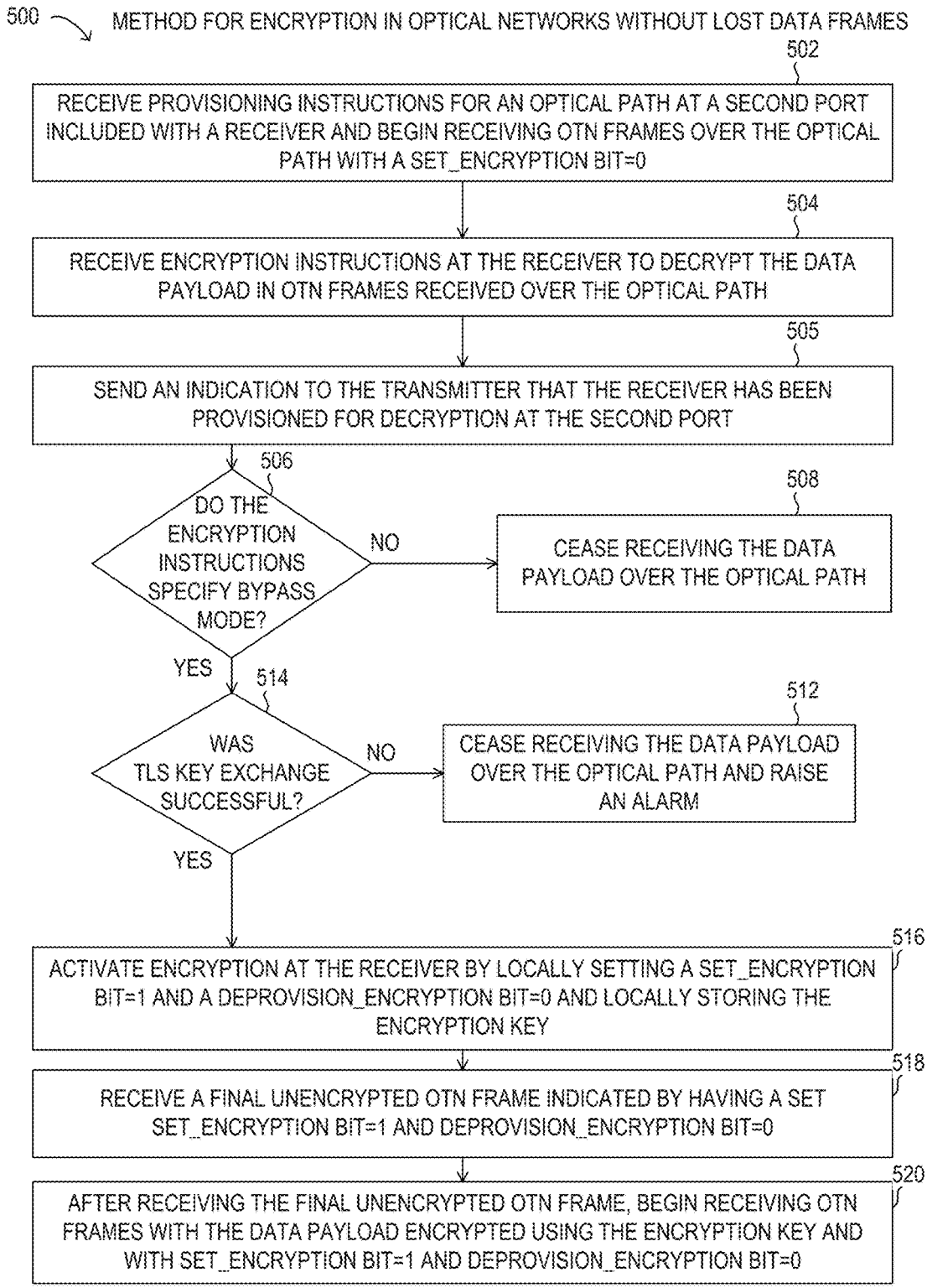
FIG. 5 is a flow chart of selected elements of a method for encryption control in optical networks without data loss.

Referring now to FIG. 5, a flow chart of selected elements of an embodiment of a method 500 for encryption control in optical networks without data loss, including the use of optical transport network overhead data for encryption, as described herein, is depicted in flowchart form. In particular, method 600 describes provisioning of encryption without lost data frames. Method 500 may be performed using optical transport network 101. In particular embodiments, method 500 may be executed by OTN transponder 300 functioning as receiver 112, as described above, for an OTN optical path between a first port at transmitter 102 and a second port at receiver 112. It is noted that certain operations described in method 500 may be optional or may be rearranged in different embodiments.

Method 500 may begin at step 502 by receiving provisioning instructions for an optical path at a second port included with a receiver and begin receiving OTN frames over the optical path with a set_encryption bit=0. The value set_encryption bit=0 may be indicative of deactivated encryption. It is noted that the logic of bits disclosed herein may be implemented with any desired polarity, in different embodiments. At step 504, encryption instructions are received at the receiver to decrypt a data payload in OTN frames received over the optical path. At step 505, an indication is sent to the transmitter that the receiver has been provisioned for decryption at the second port.

In method 500, at step 506, a decision is made whether the encryption instructions specify bypass mode, as described above with respect to method 400 (see FIG. 4). When the result of step 506 is NO and bypass mode is not specified by the encryption instructions, at step 508, method 500 ceases receiving the data payload over the optical path. Thus, when the result of step 506 is NO and bypass mode is not specified by the encryption instructions, an initial OTN frame transmitted with encrypted data payload and with set_encryption bit=1 may be dropped (not shown) by receiver 112, because receiver 112 may be enabled to activate decryption of the data payload only after a second OTN frame with set_encryption bit=1 is received, for example. When the result of step 506 is YES and bypass mode is specified by the encryption instructions, at step 514, a decision may be made whether the TLS key exchange was successful. When the result of step 514 is NO and the TLS key exchange was not successful, at step 412, method 500 ceases receiving the data payload over the optical path and raises an alarm. When the result of step 514 is YES and the TLS key exchange was successful, at step 516, encryption at the receiver is activated by locally setting set_encryption bit=1 and deprovision_encryption bit=0 and locally storing the encryption key. For example, receiver 112 may locally store the overhead encryption bits and the encryption key using FPGA 309 or memory 307, when receiver 112 is implemented as OTN transponder 300 (see FIG. 3). At step 518, a final unencrypted OTN frame is received and indicated by having set_encryption bit=1 and deprovision_encryption bit=0. At step 520, after receiving the final unencrypted OTN frame, OTN frames will begin being received with the data payload encrypted using the encryption key and with set_encryption bit=1 and deprovision_encryption bit=0.

Figure 6:
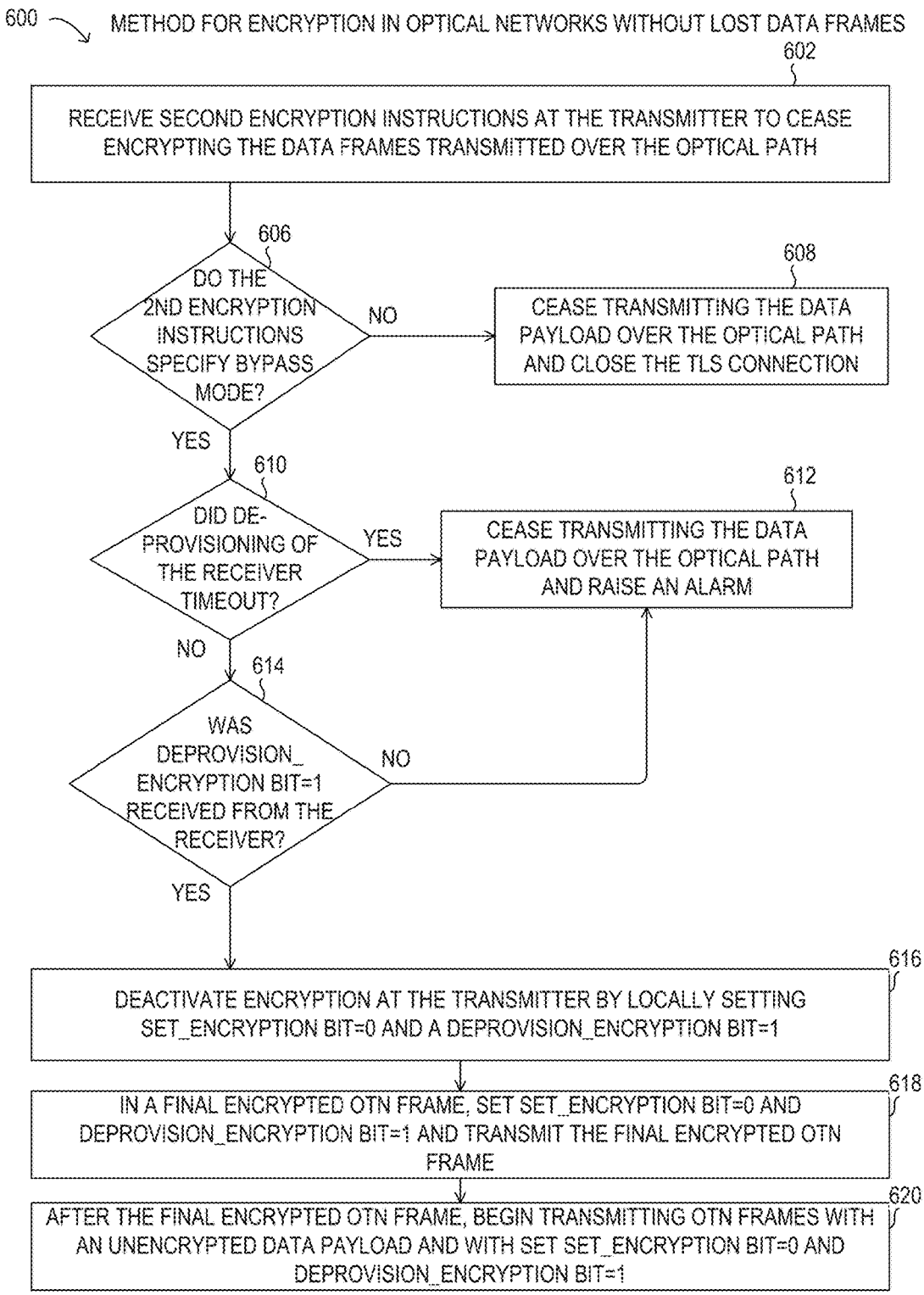
FIG. 6 is a flow chart of selected elements of a method for encryption control in optical networks without data loss.

Referring now to FIG. 6, a flow chart of selected elements of an embodiment of a method 600 for encryption control in optical networks without data loss, including use of optical transport network overhead data for encryption, as described herein, is depicted in flowchart form. In particular, method 600 describes deprovisioning of encryption without lost data frames, such as after method 400. Method 600 may be performed using optical transport network 101. In particular embodiments, method 600 may be executed by OTN transponder 300 functioning as transmitter 102, as described above, for an OTN optical path between a first port at transmitter 102 and a second port at receiver 112. It is noted that certain operations described in method 600 may be optional or may be rearranged in different embodiments.

Method 600 may begin at step 602 by receiving second encryption instructions at the transmitter to cease encrypting the data frames transmitted over the optical path. At step 606, a decision is made whether the second encryption instructions specify bypass mode, as described above with respect to method 400 (see FIG. 4). When the result of step 606 is NO and bypass mode is not specified by the second encryption instructions, at step 608, method 500 ceases transmitting the data payload over the optical path and closes the TLS connection. When the result of step 506 is YES and bypass mode is specified by the second encryption instructions, at step 610, a decision is made whether deprovisioning of the receiver has timed out. A timeout of receiver 112 may occur, for example, when step 704 (see FIG. 7) is not completed within a certain time limit, which may be a predetermined time limit. When the result of step 610 is YES and provisioning of the receiver has timed out, at step 612, method 600 ceases transmitting the data payload over the optical path and raises an alarm. It will be understood that the alarm may be handled in optical transport network 101 by appropriate entities, such by a network administrator (not shown) or by control system 200, in given embodiments. When the result of step 610 is NO and provisioning of the receiver has not timed out, at step 614, a decision is made whether deprovision_encryption bit=1 was received from the receiver. At step 614, receiver 112 may send an in-band message to transmitter 112 using the OTN optical path when bidirectional transmission is used. When bidirectional transmission is not used, receiver 112 may use auxiliary network connection 114 to send a message to transmitter 112. When the result of step 614 is NO and deprovision_encryption bit=1 was not received from the receiver, method 600 may proceed to step 612. When the result of step 614 is YES and deprovision_encryption bit=1 was received from the receiver, at step 616 encryption at the transmitter is deactivated by locally setting set_encryption bit=0 and deprovision_encryption bit=1. At step 618, in a final encrypted OTN frame, set_encryption bit=1 and deprovision_encryption bit=0 and the final unencrypted OTN frame is transmitted. At step 620, after the final encrypted OTN frame, OTN frames will begin transmitting without the data payload being encrypted and with set_encryption bit=0 and deprovision_encryption bit=1.

Figure 7:
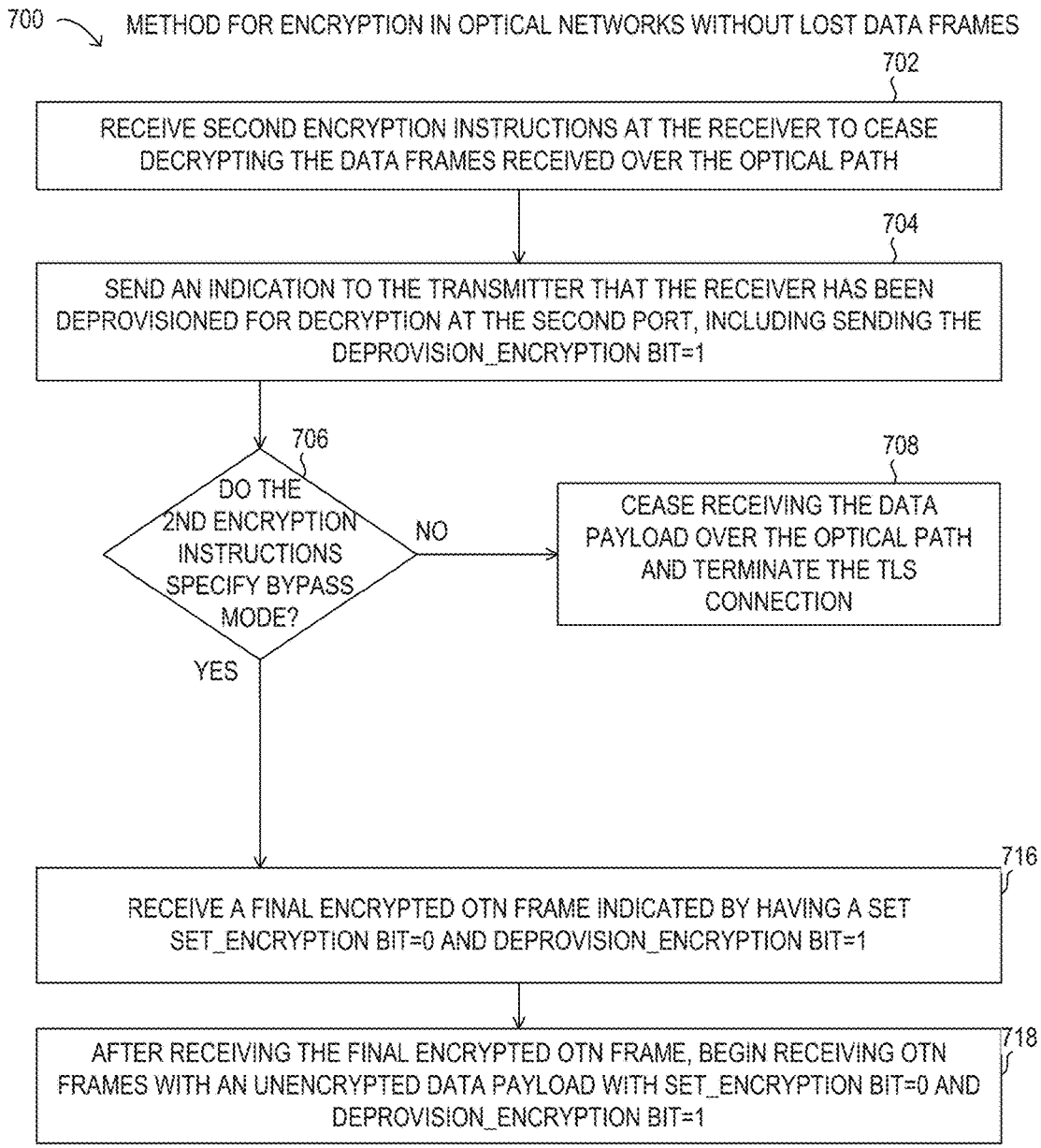
FIG. 7 is a flow chart of selected elements of a method for encryption control in optical networks without data loss.

Referring now to FIG. 7, a flow chart of selected elements of an embodiment of a method 700 for encryption control in optical networks without data loss, including use of optical transport network overhead data for encryption, as described herein, is depicted in flowchart form. In particular, method 700 describes deprovisioning of encryption without lost data frames, such as after method 500. Method 700 may be performed using optical transport network 101. In particular embodiments, method 700 may be executed by OTN transponder 300 functioning as receiver 112, as described above, for an OTN optical path between a first port at transmitter 102 and a second port at receiver 112. It is noted that certain operations described in method 700 may be optional or may be rearranged in different embodiments.

Method 700 may begin at step 702 by receiving second provisioning instructions for an optical path to cease decrypting the data frames received over the optical path. At step 704, an indication is sent to the transmitter that the receiver has been deprovisioned for decryption at the second port, including sending deprovision_encryption bit=1. In method 700, at step 706, a decision is made whether the second encryption instructions specify bypass mode, as described above with respect to method 400 (see FIG. 4). When the result of step 706 is NO and bypass mode is not specified by the second encryption instructions, at step 708, method 500 ceases receiving the data payload over the optical path and the TLS connection is terminated. At step 716, a final encrypted OTN frame is received and indicated by having set_encryption bit=0 and deprovision_encryption bit=1. At step 718, after receiving the final encrypted OTN frame, OTN frames will begin being received with an unencrypted data payload and with set_encryption bit=0 and deprovision_encryption bit=1.

Figure 8:
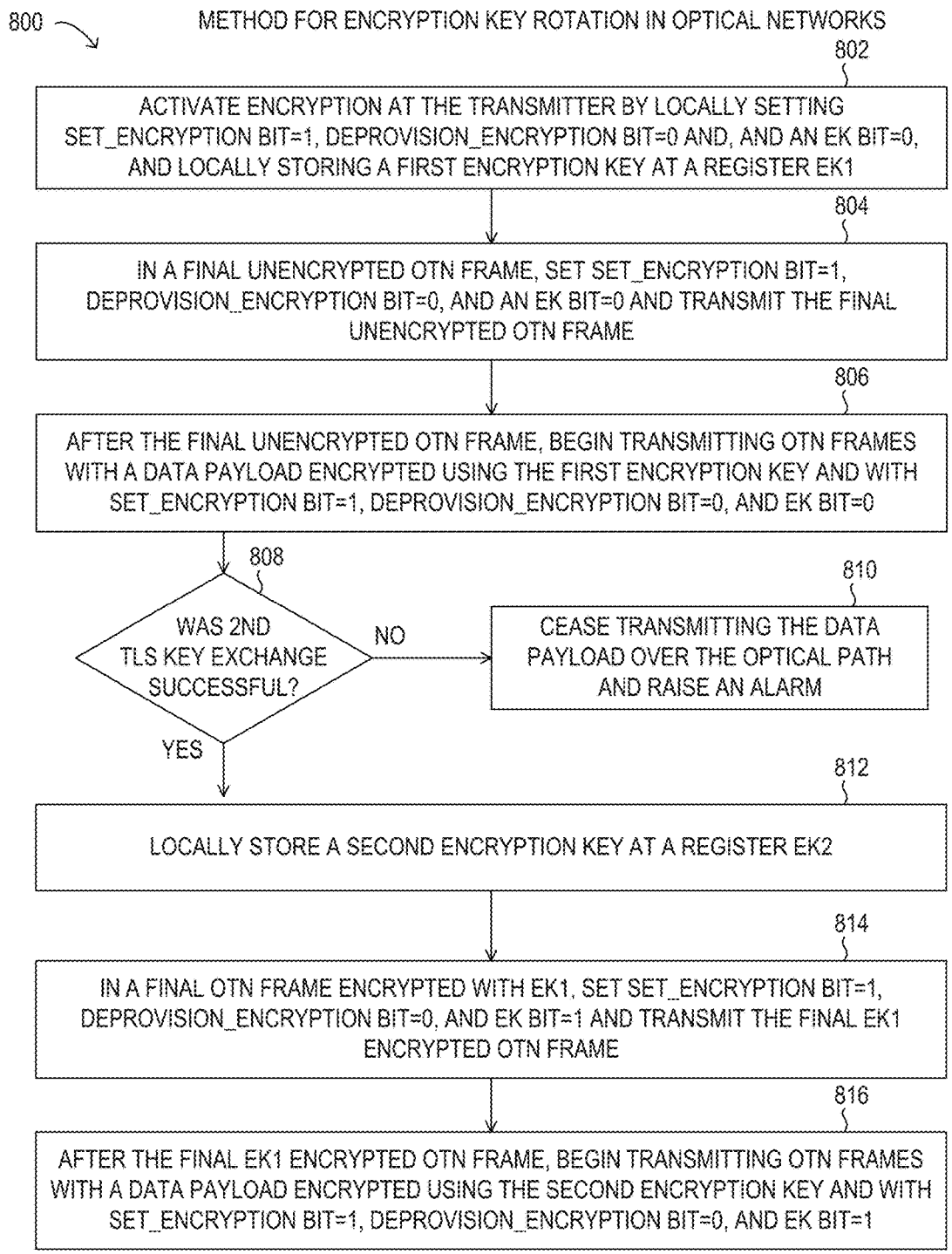
FIG. 8 is a flow chart of selected elements of a method for encryption key rotation in optical networks.

Referring now to FIG. 8, a flow chart of selected elements of an embodiment of a method 800 for encryption key rotation in optical networks without lost data frames, as described herein, is depicted in flowchart form. In particular, method 800 describes key rotation without lost data frames, and may be performed after step 414 in method 400 as an alternative embodiment. Method 800 may be performed using optical transport network 101. In particular embodiments, method 800 may be executed by OTN transponder 300 functioning as transmitter 102, as described above, for an OTN optical path between a first port at transmitter 102 and a second port at receiver 112. It is noted that certain operations described in method 800 may be optional or may be rearranged in different embodiments.

Method 800 may begin, at step 802, by activating encryption at the transmitter by locally setting set_encryption bit=1, deprovision_encryption bit=0, and EK bit=0 and locally storing a first encryption key at register EK1. For example, transmitter 102 may locally store the overhead encryption bits and the first encryption key using FPGA 309 or memory 307, when transmitter 102 is implemented as OTN transponder 300 (see FIG. 3). At step 804, in a final unencrypted OTN frame, set_encryption bit=1, deprovision_encryption bit=0, and EK bit=0 are set, and the final unencrypted OTN frame is transmitted. In step 804, transmitter 102 may select the final unencrypted OTN frame when transmitter 102 is ready to immediately transition to encryption of the data payload. The final unencrypted OTN frame is used to signal receiver 112 that the next frame will have an encrypted data payload with advance notice in order for receiver 112 to become ready to decrypt the next OTN frame received without frame loss. At step 806, after the final unencrypted OTN frame, OTN frames will begin transmitting with the data payload encrypted using the first encryption key and with set_encryption bit=1, deprovision_encryption bit=0, and EK bit=1. Then, at step 808, a decision may be made whether a second TLS key exchange was successful. When the result of step 808 is NO and the second TLS key exchange was not successful, at step 810, method 800 ceases transmitting the data payload over the optical path and raises an alarm. When the result of step 808 is YES and the second TLS key exchange was successful, at step 812, a second encryption key is locally stored at a register EK2. At step 814, in a final encrypted OTN frame encrypted with EK1 (the first encryption key), set_encryption bit=1, deprovision_encryption bit=0, and EK bit=1 are set and the final EK1 encrypted OTN frame is transmitted. At step 816, after the final EK1 encrypted OTN frame, OTN frames will begin transmitting with the data payload encrypted using the second encryption key (EK2) and with set_encryption bit=1, deprovision_encryption bit=0, and EK bit=1.

Figure 9:
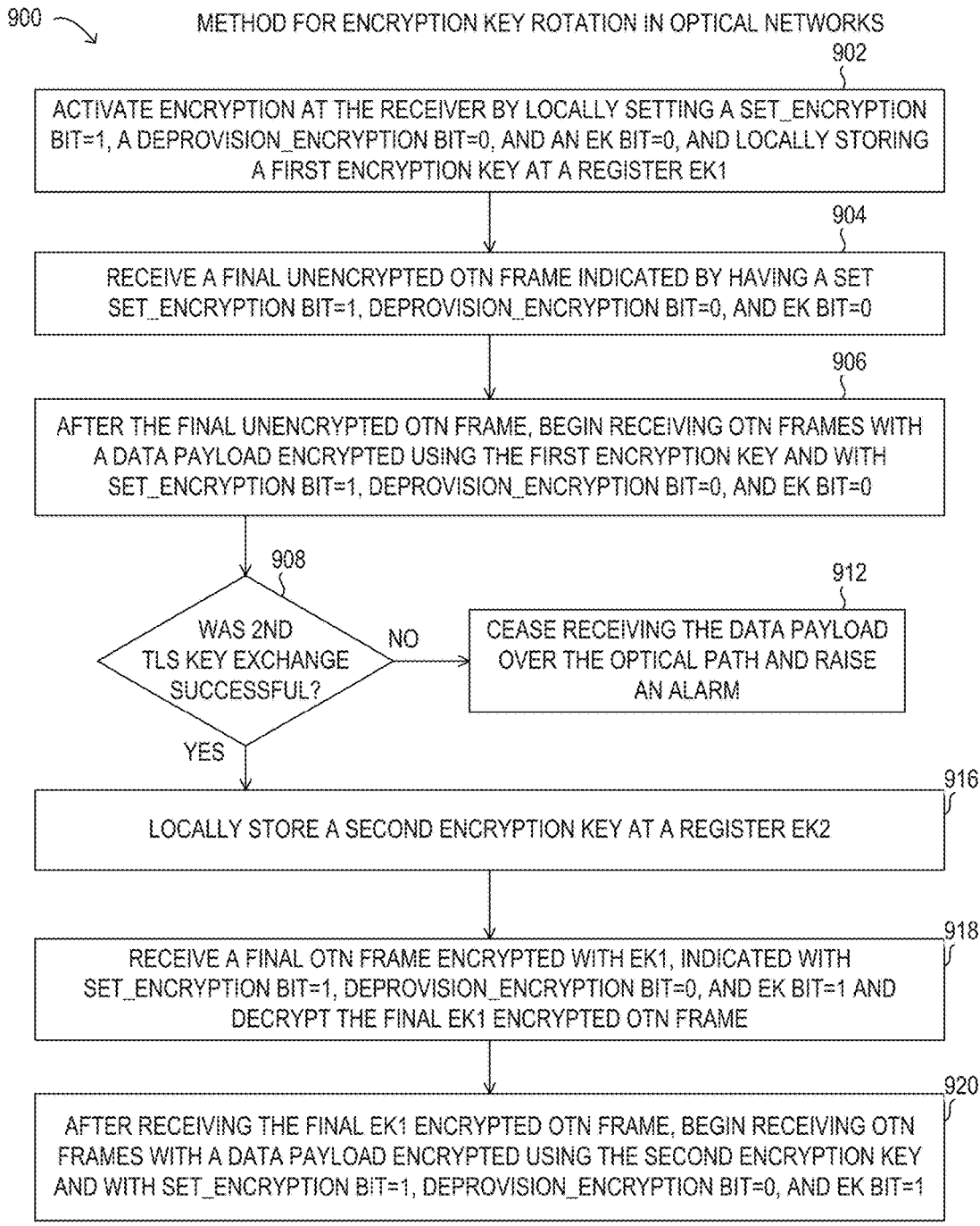
FIG. 9 is a flow chart of selected elements of a method for encryption key rotation in optical networks.

Referring now to FIG. 9, a flow chart of selected elements of an embodiment of a method 900 for encryption key rotation in optical networks without lost data frames, as described herein, is depicted in flowchart form. In particular, method 900 describes key rotation without lost data frames, and may be performed after step 514 in method 500 as an alternative embodiment. Method 500 may be performed using optical transport network 101. In particular embodiments, method 500 may be executed by OTN transponder 300 functioning as receiver 112, as described above, for an OTN optical path between a first port at transmitter 102 and a second port at receiver 112. It is noted that certain operations described in method 800 may be optional or may be rearranged in different embodiments.

Method 900 may begin at step 902 by activating encryption at the receiver by locally setting set_encryption bit=1, deprovision_encryption bit=0, and EK bit=0 and locally storing a first encryption key at a register EK1. For example, receiver 112 may locally store the overhead encryption bits and the second encryption key using FPGA 309 or memory 307, when receiver 112 is implemented as OTN transponder 300 (see FIG. 3). At step 904, a final unencrypted OTN frame is received and indicated by having set_encryption bit=1, deprovision_encryption bit=0, and EK bit=0. At step 906, after receiving the final unencrypted OTN frame, OTN frames will begin being received with the data payload encrypted using the first encryption key and with set_encryption bit=1, deprovision_encryption bit=0, and EK bit=0. Then, at step 908, a decision may be made whether a second TLS key exchange was successful. When the result of step 908 is NO and the second TLS key exchange was not successful, at step 912, method 900 ceases transmitting the data payload over the optical path and raises an alarm. When the result of step 908 is YES and the second TLS key exchange was successful, at step 916, a second encryption key is locally stored at a register EK2. At step 918, a final encrypted OTN frame encrypted with EK1 (the first encryption key) is received, indicated with set_encryption bit=1, deprovision_encryption bit=0, and EK bit=1. At step 920, after the final EK1 encrypted OTN frame is received, OTN frames will begin being received with the data payload encrypted using the second encryption key (EK2) and with set_encryption bit=1, deprovision_encryption bit=0, and EK bit=1.

Figure 10:
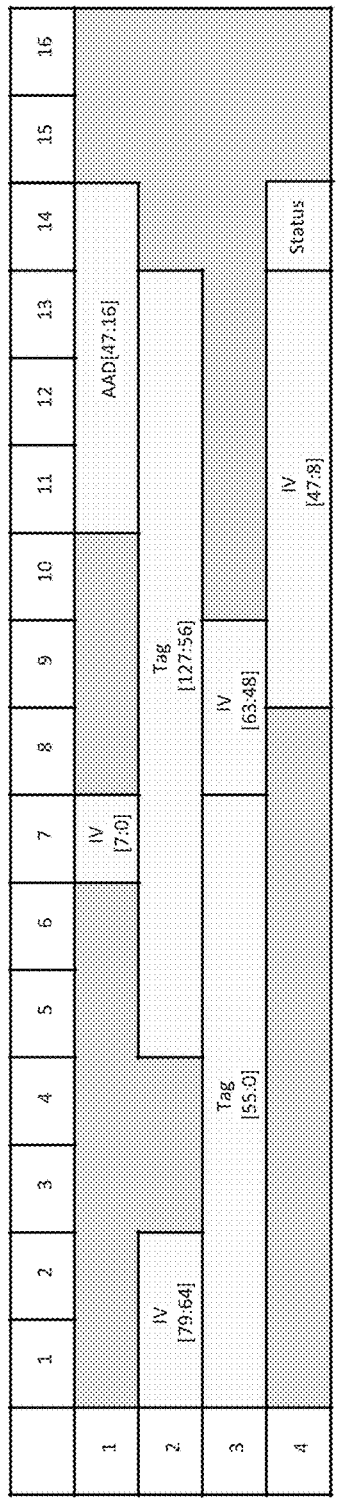
FIG. 10 a block diagram of selected elements of an embodiment of OTN frame overhead data.

Referring now to FIG. 10, a block diagram of selected elements of an embodiment of an OTN frame overhead data 1000 is illustrated. In the depiction shown in FIG. 10, OTN frame overhead data 1000 is shown as a 64-byte header, such as an ODU header, in a 16 column×4 row format. In the ODU, OTN frame overhead data 1000 is not collectively encrypted, even when payload data in the ODU are encrypted. The payload data may consist of 15,232 bytes (or 3,808 columns×4 rows) that are appended to OTN frame overhead data 1000. In some embodiments, the ODU may include a forward error correction (FEC) portion that is appended to the payload data and that is also not encrypted.

When encryption is used for the payload data of the ODU, a block cipher may be applied 952 times to each 128 bit portion of the payload data, using an AES-256 encryption key, for example, using a GCM algorithm, as described previously.

In OTN frame overhead data 1000, certain data structures for encryption control in optical networks without data loss are depicted. Additional authenticated data (AAD) may include certain overhead encryption bits that are used for signaling between transmitters and receivers, as described previously. The overhead encryption bits may include a set_encryption bit indicative of whether the data payload is encrypted or unencrypted, a deprovision_encryption bit indicative of deprovisioning of encrypting the data payload, and at least one encryption key bit identifying an encryption key selected from a plurality of encryption keys, among other signaling bits and flags used. In particular embodiments, the overhead encryption bits may be stored using 4 bytes, such as the 4 bytes comprised of bits AAD[47:16], shown in bytes 11 through 14 of OTN frame overhead data 1000. An initialization vector (IV) may include a 48-bit counter value that counts OTN frames and is reset each time the encryption key is changed. The 48-bit counter value may be used by receiver 112 to detect when OTN frames are received out of sequence or are dropped. In particular embodiments, the 48-bit counter value may be stored using 6 bytes, such as the 6 bytes comprised of bits IV[47:0], shown in byte 7, and bytes 57 through 61 of OTN frame overhead data 1000. Also, a 128-bit tag may be used in OTN frame overhead data 1000 for data integrity of the AAD. For example, the AAD and the encryption key may be used to authenticate the 128-bit tag upon receipt of each OTN frame. When the 128-bit is not authenticated, the OTN frame may be dropped. In particular embodiments, the 128-bit tag may be stored using 16 bytes, such as the 16 bytes comprised of bits Tag[127:0], shown in bytes 21 through 29 and bytes 33 through 39 of OTN frame overhead data 1000. Also, byte 62 of OTN frame overhead data 1000 may be used as a Status byte to indicate various internal conditions, for example, using individual bits or groups of bits.

As disclosed herein, methods and systems may use optical transport network overhead data for encryption. In particular, specific overhead encryption bits and other encryption data may be stored in an OTN header and used for signaling between a transmitter and a receiver for encrypted transmission without lost data frames.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for encryption in optical transport networks, the method comprising:
    receiving, at a transmitter and a receiver, provisioning instructions for provisioning an optical path between a first port at the transmitter and a second port at the receiver in an optical transport network (OTN);
    establishing a communication channel from the first port to the second port;
    using the communication channel, establishing a Transport Layer Security (TLS) connection over the OTN between the first port and the second port;
    using the TLS connection to generate and share an encryption key usable for transmitting payload data from the first port to the second port, wherein the encryption key is stored at the transmitter and at the receiver;
    receiving, at the transmitter and at the receiver, encryption instructions to encrypt a data payload in OTN frames transmitted from the first port to the second port; and
    using overhead encryption bits in an overhead portion of the OTN frames for encryption signaling, the overhead encryption bits including:
        a set_encryption bit indicative of whether the data payload is encrypted or unencrypted;
        a deprovision_encryption bit indicative of deprovisioning of encrypting the data payload; and
        at least one encryption key bit identifying an encryption key selected from a plurality of encryption keys;
    using the encryption key, encrypting the payload data over the optical path from the first port to the second port using an encryption protocol different from TLS.

2. The method of claim 1, further comprising:
    using the overhead encryption bits to perform a first transition from an unencrypted data payload to an encrypted data payload without loss of an OTN frame during the first transition.

3. The method of claim 1, further comprising:
    using the overhead encryption bits to perform a second transition from an encrypted data payload to an unencrypted data payload without loss of an OTN frame during the second transition.

4. The method of claim 1, further comprising:
    using the overhead encryption bits to perform a third transition from the transmitter and the receiver using a first encryption key to using a second encryption key without loss of an OTN frame during the third transition.

5. The method of claim 1, wherein the overhead encryption bits are stored as additional authenticated data (AAD) in the overhead portion of the OTN frames using a 32-bit vector at bytes 11 through 14 in a 64-byte OTN header.

6. The method of claim 5, further comprising:
    using a 128-bit tag in an overhead portion of the OTN frames for data integrity of the AAD, wherein the AAD and the encryption key are used to authenticate the 128-bit tag, and wherein the 128-bit tag is stored in the OTN frames at bytes 21 through 29 and bytes 33 through 39 in a 64-byte OTN header.

7. The method of claim 1, further comprising:
    using an initialization vector (IV) in an overhead portion of the OTN frames to store a 48-bit counter value that counts OTN frames and is reset each time the at least one encryption key is changed.

8. The method of claim 7, wherein the 48-bit counter value is stored in the OTN frames at byte 7 and bytes 57 through 61 in a 64-byte OTN header.

9. The method of claim 1, wherein the at least one encryption key is locally stored at both the transmitter and at the receiver.

10. The method of claim 1, wherein the transmitter and the receiver are OTN transponders.

11. An optical transport network (OTN), comprising:
an optical path provisioned between a first port at a transmitter and a second port at a receiver included in the OTN, wherein the transmitter and the receiver are enabled for:
establishing a communication channel from the first port to the second port;
using the communication channel, establishing a Transport Layer Security (TLS) connection over the OTN between the first port and the second port;
using the TLS connection to generate and share an encryption key usable for transmitting payload data from the first port to the second port, wherein the encryption key is stored at the transmitter and at the receiver;
receiving provisioning instructions for provisioning the optical path;
receiving encryption instructions to encrypt a data payload in OTN frames transmitted from the first port to the second port; and
using overhead encryption bits in an overhead portion of the OTN frames for encryption signaling, the overhead encryption bits including:
a set_encryption bit indicative of whether the data payload is encrypted or unencrypted;
a deprovision_encryption bit indicative of deprovisioning of encrypting the data payload; and
at least one encryption key bit identifying an encryption key selected from a plurality of encryption keys;
using the encryption key, encrypting the payload data over the optical path from the first port to the second port using an encryption protocol different from TLS.

12. The OTN of claim 11, wherein the transmitter and the receiver are further enabled for:
using the overhead encryption bits to perform a first transition from an unencrypted data payload to an encrypted data payload without loss of an OTN frame during the first transition.

13. The OTN of claim 11, wherein the transmitter and the receiver are further enabled for:
using the overhead encryption bits to perform a second transition from an encrypted data payload to an unencrypted data payload without loss of an OTN frame during the second transition.

14. The OTN of claim 11, wherein the transmitter and the receiver are further enabled for:
using the overhead encryption bits to perform a third transition from the transmitter and the receiver using a first encryption key to using a second encryption key without loss of an OTN frame during the third transition.

15. The OTN of claim 11, wherein the overhead encryption bits are stored as additional authenticated data (AAD) in the overhead portion of the OTN frames using a 32-bit vector at bytes 11 through 14 in a 64-byte OTN header.

16. The OTN of claim 15, wherein the transmitter and the receiver are further enabled for:
using a 128-bit tag in an overhead portion of the OTN frames for data integrity of the AAD, wherein the AAD and the encryption key are used to authenticate the 128-bit tag, and wherein the 128-bit tag is stored in the OTN frames at bytes 21 through 29 and bytes 33 through 39 in a 64-byte OTN header.

17. The OTN of claim 11, wherein the transmitter and the receiver are further enabled for:
using an initialization vector (IV) in an overhead portion of the OTN frames to store a 48-bit counter value that counts OTN frames and is reset each time the at least one encryption key is changed.

18. The OTN of claim 17, wherein the 48-bit counter value is stored in the OTN frames at byte 7 and bytes 57 through 61 in a 64-byte OTN header.

19. The OTN of claim 11, wherein the at least one encryption key is locally stored at both the transmitter and at the receiver.

20. The OTN of claim 11, wherein the transmitter and the receiver are OTN transponders.

* * * * *